United States Patent [19]
Lachonius et al.

[11] Patent Number: 4,597,492
[45] Date of Patent: Jul. 1, 1986

[54] CONVEYOR CHAIN

[75] Inventors: Leif Lachonius, Surte; Carl Ullberg, Lerum, both of Sweden

[73] Assignee: Aktiebolaget SKF, Goteborg, Sweden

[21] Appl. No.: 724,028

[22] Filed: Apr. 17, 1985

Related U.S. Application Data

[63] Continuation of Ser. No. 413,136, Aug. 30, 1982, abandoned.

[30] Foreign Application Priority Data

Sep. 30, 1981 [SE] Sweden ................................ 8105758

[51] Int. Cl.4 ............................................. B65G 17/06
[52] U.S. Cl. ..................................... 198/852; 198/853
[58] Field of Search ................. 198/850, 851, 852, 853

[56] References Cited

U.S. PATENT DOCUMENTS

| 2,071,485 | 2/1937 | Worrall | 198/852 |
| 2,319,617 | 5/1943 | Manierre | 198/852 |
| 3,269,526 | 8/1966 | Imse et al. | 198/853 |
| 3,768,631 | 10/1973 | Wahren | 198/852 |
| 3,910,404 | 10/1975 | Henrekson | 198/852 X |

FOREIGN PATENT DOCUMENTS

| 206755 | 5/1955 | Australia | 198/853 |
| 380959 | 9/1932 | United Kingdom | 198/853 |
| 1298231 | 11/1972 | United Kingdom | 198/851 |
| 1501619 | 2/1978 | United Kingdom | 198/853 |
| 377109 | 6/1973 | U.S.S.R. | 198/851 |

Primary Examiner—Joseph E. Valenza
Assistant Examiner—Jonathan D. Holmes
Attorney, Agent, or Firm—Eugene E. Renz, Jr.

[57] ABSTRACT

The invention relates to a conveyor chain having a number of links connected by cardan joints. Each link has a main portion (2) and a fork portion (3, 4) the fork surrounding the main portion of an adjacent link. A rotatable element (6) is arranged in a bore (5) in the main portion and a pin (7) extends into each fork leg from the rotatable element. In order to improve strength and provide largest possible contact surfaces in the members possible against the pin, the pin is fixed in the element (6) and slidable in bores (9) in parts (10, 11) extending from the respective fork legs.

2 Claims, 11 Drawing Figures

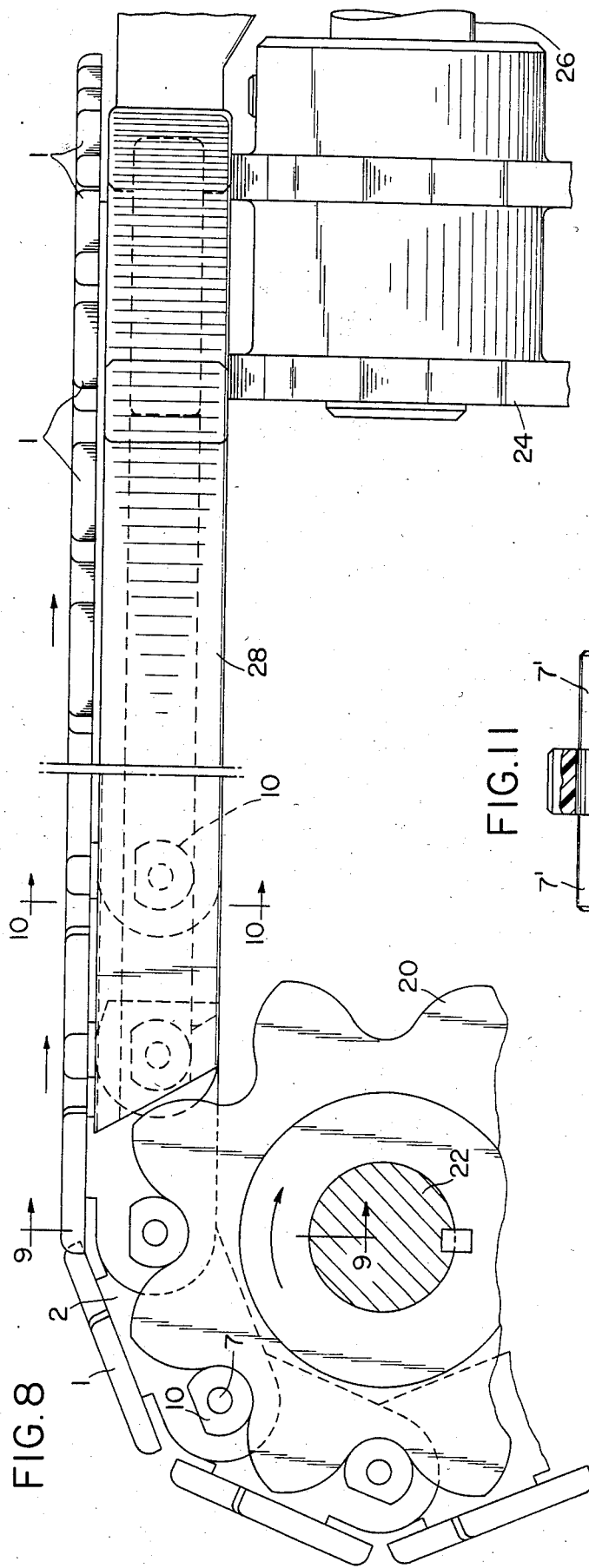
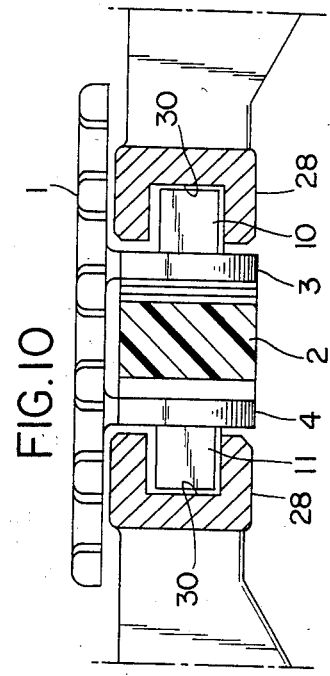
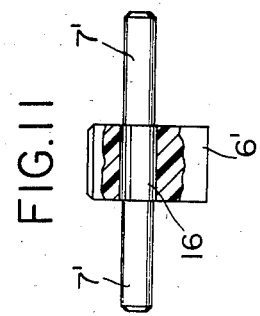
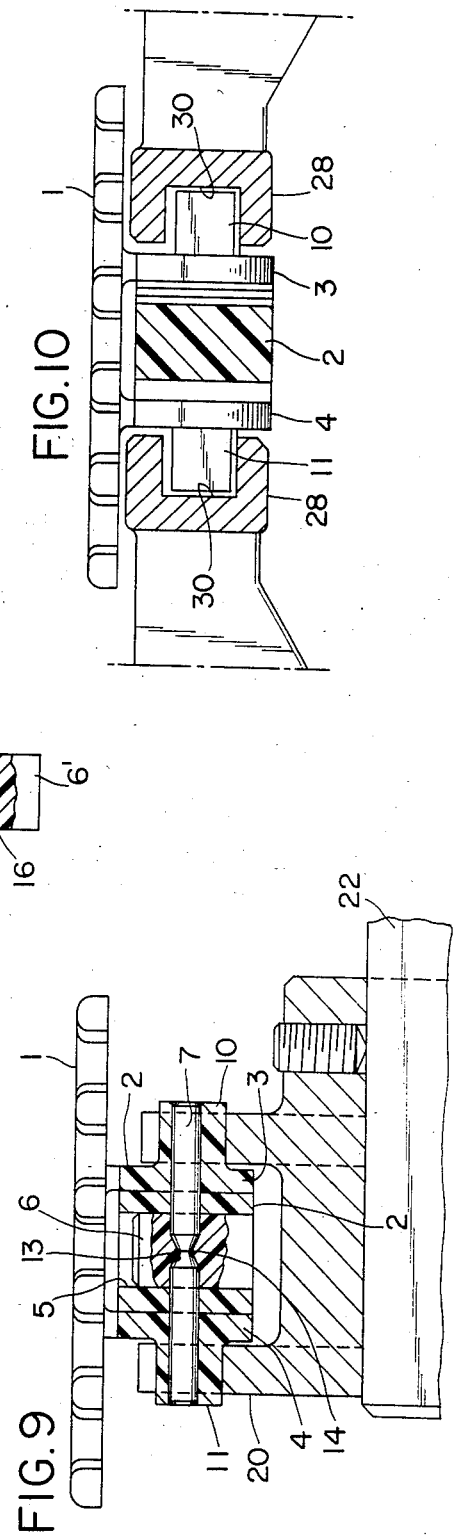

CONVEYOR CHAIN

This is a continuation, of application Ser. No. 413,136 filed Aug. 30, 1982, now abandoned.

The invention relates to a conveyor chain of the kind described in the introduction of the appended claim 1.

Conveyor chains in which the links are mutually inclinable around two axes which are arranged generally perpendicular to each other and to the direction of motion of the chain, so-called cardan link chains, are known from e.g. the U.S. Pat. No. 3,768,631. These chains usually comprise a pin extending between two fork legs in a link, and the pin is rotatably mounted in a cylindrical element which in its turn is rotatably arranged in a bore or a recess in a portion of an adjacent link, which portion is surrounded by said fork legs. The pin is fixed to the fork legs. Chains with comparatively large dimensions are usually driven by toothed wheels, whose teeth mesh with a bevelled or rounded portion of the cylindrical element, which, together with the pin and the fork legs, is being heavily stressed. Said parts, therefore, have to be comparatively strong. Furthermore, the cylindrical element has to be so big that the surface pressure between the pin and the wall of the bore through the cylindrical element in which the pin is arranged can be kept within permissible limits, i.e. the bore in the element must be comparatively long and have a big diameter. In chains with smaller dimensions than those in common use the stress is sometimes so great that the cylindrical element of the fork legs, which usually are made of plastics, fail. The known designs are thus unsuitable for chains with small dimensions.

The object of the present invention is to provide a conveyor chain of the kind mentioned above, which has a sufficient strength even when the dimensions are small. This is achieved, according to invention, by a device whose characterizing features appear from the appended claims. The invention provides a strong and flexible conveyor chain which can be used in various conveyors in which chains of the kind referred to have not earlier been usable because of their dimensions.

In the following the invention is described in detail with reference to the accompanying drawing, in which;

FIG. 8 is a fragmentary side elevational view of a conveyor line assembly made up of links connected by cardan joints and being driven by double-toothed driving sprockets each having an axis of rotation perpendicular to one another;

FIG. 9 is a fragmentary transverse sectional view taken on line 9—9 of FIG. 8 showing details of the double-toothed driving sprocket cooperating with the trunnions of the individual links;

FIG. 10 is a transverse sectional view taken on line 10—10 of FIG. 8 showing additional details of the supporting side guides for the individual links and the included grooves for the link trunnions; and FIG. 11 is a side elevational view of a modified cylindrical element having an imbedded and non-rotatable pin affixed thereto.

Figure 1:
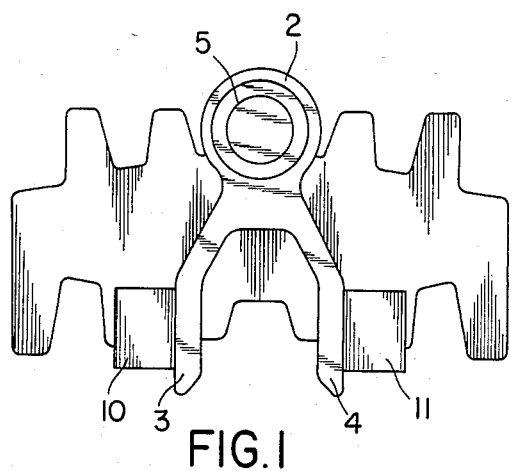
FIGS. 1, 2 and 3 show different views of a link of a chain arranged according to one embodiment of the invention.
Figure 2:
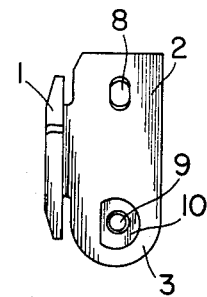
Figure 3:
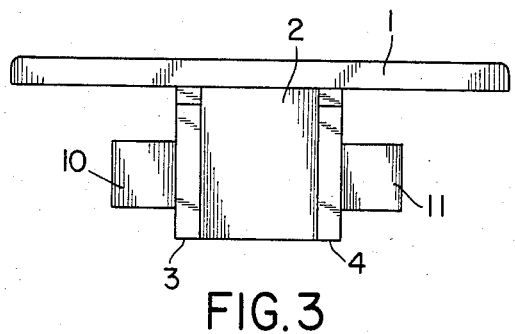

It appears from FIGS. 1-3 that a chain link comprises a load-carrying plate 1, a main portion 2 and a fork portion with two fork legs 3, 4, extending from the main portion. A cylindrical bore 5 is arranged in the main portion generally perpendicular to the direction of motion of the chain.

Figure 4:
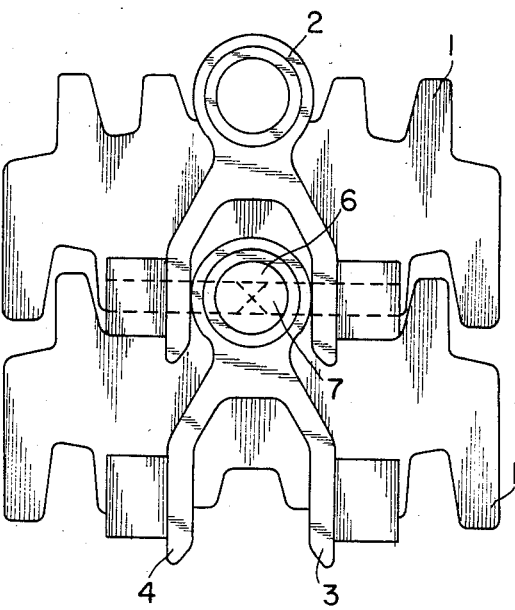
FIG. 4 shows a view of two connected chain links.

FIG. 4 shows the mutual position of two interconnected chain links. It is evident that the load-carrying plates are provided with rows of teeth with intermesh and are so arranged that the chain can be bent in the plane of the plates.

Figure 5:
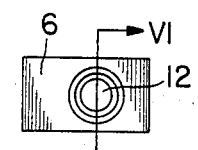
FIG. 5 shows a cylindrical element which is a part of a device according to the invention.
Figure 6:
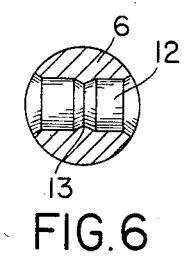
FIG. 6 is a section VI—VI of FIG. 5.
Figure 7:
FIG. 7 is a pin which belongs to a device according to the invention.

The links are kept together by a cylindrical element 6 (FIGS. 5 and 6) which is rotatably arranged in the bore 5, and a pin 7 (FIG. 7) arranged generally perpendicular to the direction of chain motion and to the bore 5 and extending between the fork legs 3, 4 and through the cylindrical element 6 which is provided in a bore 5 in an adjacent link, the main portion 2 of which being surrounded by the fork legs and having recesses 8 through it for the pin. The recesses are elongated to allow the pin 7 to follow the turning of the element 6 in the bore 5 when the chain is bent. The pin 7 is fixed in the element 6 and rotatably arranged in cylindrical bores 9 in the respective fork legs. The walls in the bores 9 are thus bearing surfaces for the pin 7, and in order to extend the bearing surface and thereby decrease the surface pressure the fork legs are provided with protruding portions 10, 11 in which the bores 9 are arranged. These portions are used for guiding the chain along a conveyor line 28 which is provided with grooves 50 in which the portions 10, 11 run, and for driving the chain with toothed wheels 20 mounted on a drive shaft 22 whose teeth co-operate with said portions 10, 11, whereby the element 6 is not directly influenced by any driving teeth. Thus, it can be completely surrounded by reinforcing material in the link, which thereby can be made very rugged without its outer measures having to be great. No weakening recesses for co-operation with driving teeth are necessary on the link, and the strength of the pin 7 is used both for driving of the chain and for interconnecting the chain links.

The pin 7 is provided in a bore 12 in the cylindrical element 6. The wall surface of the bore 12 is comparatively small and is therefore not suitable as a sliding bearing surface for the pin 7. Instead the pin is fixed in the bore 12 and immobile in relation to the element 6, which makes it possible for these members to take up relatively great forces. In order to make possible fast and simple mounting of the chain, the pin is suitably arranged with press fit in the bore 12 of the element 6, which is preferably made of an elastically deformable material. The pin can easily be snapped into the desired position if the bore in the element is provided with a protrusion 13 and the pin has a corresponding recess 14. When two links are joined, the pin can thereby be pushed through the bore in a portion 10 of a fork leg 3, across the main portion 2 and the element 6 in the adjoining link and out into the bore in the portion 11 of the fork leg 4. Since the pin is rotatably mounted in the bores 9 in the respective fork legs, the links can be tilted in relation to each other around the axis of the pin 7, whereby the chain can be bent also in a plane perpendicular to the plane of the plates 1. Thus, the chain can be bent in all directions. Tensions in the chain are transmitted via pin 7 and large bearing surfaces of the walls in the bores 9.

Also other embodiments of the invention than the one described above are of course possible within the scope of the claims. For example, the load-carrying portions may be designed in other ways and do not necessarily have to be plates. The pin 7' may be fixed in the element 6' in other ways, or possibly be integral with said element as at 16.

What is claimed is:

1. A conveyor assembly comprising a main frame including side rails having confronting grooves and an endless conveyor chain having a plurality of interconnected links, each link comprising a main portion (2) and a portion with two legs (3,4) extending from the main portion and enclosing the main portion of an adjacent link, the main portion having a cylindrical bore (5) generally perpendicular to the direction of motion of the chain, a cylindrical element (6) being rotatably arranged in said bore, a pin (7) arranged generally perpendicular to the direction of motion of the chain and to said bore extending between the two legs on either side of the cylindrical element (6) and through the main portion (2) of an adjacent link, the pin being arranged in the cylindrical element and in the respective legs, characterized by trunnions (10, 11) extending outwardly in opposite directions from the legs and being provided with bores (9) for taking up the pin (7), said pin being fixedly secured to the cylindrical element (6) and freely rotatably mounted in the bores (9) in the trunnions (10, 11), said trunnions engageable in said grooves for supporting and guiding said links and drive means engageable with the trunnions for actuating the conveyor chain, said pin being press fitted in a bore (12) in the cylindrical element (6), said element being of an elastically deformable material and the pin having a recess (14) in which a corresponding protrusion (13) in the bore of the element is snapped when the pin is brought into position in the bore during interconnection of two chain links.

2. A conveyor assembly as claimed in claim 1, wherein the trunnions are of circular cross-section and including a flat on the upper portion of each trunnion defining a chord.

* * * * *